US012064785B2

(12) United States Patent
Jang et al.

(10) Patent No.: US 12,064,785 B2
(45) Date of Patent: Aug. 20, 2024

(54) COATING APPARATUS FOR WINDOW AND COATING METHOD USING THE SAME

(71) Applicant: Samsung Display Co., Ltd., Yongin-si (KR)

(72) Inventors: Seoyoung Jang, Hwaseong-si (KR); Boa Kim, Icheon-si (KR); Yong-Kwan Kim, Yongin-si (KR); Jiin Yoon, Asan-si (KR); Kyungeun Lee, Asan-si (KR); Jinnyoung Heo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/989,177

(22) Filed: Nov. 17, 2022

(65) Prior Publication Data

US 2023/0201866 A1 Jun. 29, 2023

(30) Foreign Application Priority Data

Dec. 23, 2021 (KR) ........................ 10-2021-0186581

(51) Int. Cl.
*B05C 13/00* (2006.01)
*B05C 5/02* (2006.01)
*B05D 1/02* (2006.01)
*C03C 17/00* (2006.01)

(52) U.S. Cl.
CPC ................ *B05C 13/00* (2013.01); *B05C 5/02* (2013.01); *B05D 1/02* (2013.01); *C03C 17/002* (2013.01); *C03C 2218/112* (2013.01)

(58) Field of Classification Search
CPC .................................................. C03C 2218/00
See application file for complete search history.

(56) References Cited

U.S. PATENT DOCUMENTS

| 8,808,798 B2 | 8/2014 | Kitano et al. |
| 2007/0195653 A1* | 8/2007 | Yassour ................. B24B 37/30 369/13.24 |

FOREIGN PATENT DOCUMENTS

| KR | 101215705 B1 | 12/2012 |
| KR | 101641090 B1 | 7/2016 |
| KR | 1020170121525 A | 11/2017 |

* cited by examiner

*Primary Examiner* — Michael P. Rodriguez
(74) *Attorney, Agent, or Firm* — CANTOR COLBURN LLP (57) ABSTRACT

A window coating jig includes: a base part and a stage which includes a support part, a first sidewall part surrounding the support part and defining an outer wall, and a second sidewall part disposed between the support part and the first sidewall part, and protrudes from the base part, wherein a blow groove is defined between the first sidewall part and the second sidewall part, a suction groove is defined between the second sidewall part and the support part, the base part has a blow hole and a suction hole passing through the base part, the blow hole and the suction hole being defined therein, the blow hole overlaps the blow groove, the suction hole overlaps the suction groove, and the first sidewall part has a vent opening passing therethrough in a direction crossing the direction in which the blow hole extends, the vent opening being defined therein.

4 Claims, 13 Drawing Sheets

COATING APPARATUS FOR WINDOW AND COATING METHOD USING THE SAME

This application claims priority to Korean Patent Application No. 10-2021-0186581, filed on Dec. 23, 2021, and all the benefits accruing therefrom under 35 U.S.C. 119, the contents of which in its entirety are herein incorporated by reference.

BACKGROUND

The present disclosure herein relates to a window coating apparatus and a window coating method using the same, and more particularly, to a coating apparatus including a window coating jig, which may reduce contamination of the side and rear surfaces of a window, and a coating method using the same.

A mobile device or a large-sized device such as a television includes a display panel in which pixels are arranged to display an image, and a window configured to protect the display panel. The display panel may include a liquid crystal display panel or an organic light-emitting display panel. A user sees an image displayed on the display panel through the window.

Various layers may be coated on the window in order to improve durability, prevent fingerprints, and the like. A coating material may be applied on the window.

SUMMARY

The present disclosure provides a coating apparatus, which includes a coating jig configured to minimize contamination of a coating material on the side and rear surfaces of a window during a coating process, and a coating method using the same.

An embodiment of the invention provides a window coating jig including: a base part; and a stage which includes a support part, a first sidewall part surrounding the support part and defining an outer wall, and a second sidewall part disposed between the support part and the first sidewall part, and protrudes from the base part. A blow groove is defined between the first sidewall part and the second sidewall part, a suction groove is defined between the second sidewall part and the support part, the base part has a blow hole and a suction hole, which pass through the base part, the blow hole overlaps the blow groove in a plan view, the suction hole overlaps the suction groove in the plan view, and the first sidewall part has a vent opening passing therethrough in a first direction crossing a second direction in which the blow hole extends.

In an embodiment, the blow hole may be provided in plurality, and a separation distance between adjacent blow holes of the plurality of blow holes may be about 10 millimeters (mm) to about 30 mm.

In an embodiment, the suction hole may be provided in plurality, and the number of the suction holes may be greater than the number of the blow holes.

In an embodiment, each of the blow holes may have a diameter of about 0.3 mm to about 1.0 mm.

In an embodiment, the first sidewall part may include a long side part and a short side part extending in directions crossing each other, and about 4 to about 12 vent openings may be provided to at least any one of the long side part or the short side part.

In an embodiment, the vent openings may be provided only to the long side part.

In an embodiment, the first sidewall part may include a first side surface extending from the base part, a second side surface opposite to the first side surface and defining the blow groove, and an upper surface connecting the first side surface and the second side surface to each other, wherein a distance from the upper surface to the vent opening may be about 0.6 mm to about 1.0 mm.

In an embodiment, a diameter of the vent opening may be about 0.3 mm to about 1.0 mm.

In an embodiment, the first sidewall part may include a first side surface extending from the base part, a second side surface opposite to the first side surface and defining the blow groove, and an upper surface connecting the first side surface and the second side surface to each other, wherein the vent opening may be recessed in a direction toward the base part from the upper surface to have a semicircular shape.

In an embodiment, a height of the stage protruding from the base part may be about 1 mm to about 5 mm.

In an embodiment, the support part may have outer side holes connected to the suction hole and passing through the support part, and the outer side holes may be arranged along an edge of the support part.

In an embodiment, the support part may have additional suction holes surrounded by the outer side holes and passing through the support part.

In an embodiment, an upward air flow may be provided to the blow groove through the blow hole, and a downward air flow may be provided to the suction groove, the side holes, and the additional suction holes through the suction hole.

In an embodiment of the invention, a window coating apparatus may include: a window; a window coating jig including a base part and a stage which protrudes from the base part and on which the window is disposed; and a spray unit configured to provide a coating material to the window, wherein: the stage has a blow groove near an edge of the stage, a suction groove provided more inward than the blow groove, and a vent opening passing through therein from an outer wall of the stage to the blow groove; the base part has a blow hole, which overlaps the blow groove in a plan view and provides an upward air flow between the window and the blow groove, and a suction hole, which overlaps the suction groove in a plan view and provides a downward air flow between the window and the suction groove; and a pressure of air which is provided from the blow hole is greater than a pressure of air which is discharged from the vent opening to the outside.

In an embodiment, an air pocket may be formed between the window and the blow groove due to a difference between the pressure of air which is provided from the blow hole and the pressure of air which is discharged from the vent opening to the outside.

In an embodiment, a depth of the air pocket from a rear surface of the window may be about 0.4 mm to about 1.0 mm.

In an embodiment, the stage may include a support part, a first sidewall part surrounding the support part and having the vent opening defined therein, and a second sidewall part disposed between the support part and the first sidewall part, wherein the blow groove is defined between the first sidewall part and the second sidewall part and the suction groove is defined between the second sidewall part and the support part.

In an embodiment, the first sidewall part may include a first side surface extending from the base part, a second side surface opposite to the first side surface and defining the blow groove, and an upper surface connecting the first side surface and the second side surface to each other, wherein an end of the window may be aligned with the first side surface.

In an embodiment, the end of the window may protrude from the first side surface.

In an embodiment of the invention, a window coating method includes: providing a window on a window coating jig including a base part and a stage, wherein the base part has a blow hole and a suction hole defined therein, the stage has a blow groove connected to the blow hole, a suction groove connected to the suction hole, and a vent opening formed in an outer wall, and the blow groove, the suction groove, and the vent opening are defined in the stage; providing a downward air flow to the suction hole by an air-flow-generating unit to fix the window on the stage; providing an upward air flow to the blow hole by the air-flow-generating unit to form an air pocket which is formed due to a difference in air pressure between the window and the blow groove; and applying a coating solution on the window, wherein the pressure of air which is provided from the blow hole is greater than the pressure of air which is discharged from the vent opening to the outside.

In an embodiment, a depth of the air pocket from the rear surface of the window may be about 0.4 mm to about 1.0 mm.

In an embodiment, the air pocket may be provided in plurality in the blow groove, the blow groove may be provided in plurality, and a separation distance between adjacent blow grooves of the plurality of blow grooves may be about 10 mm to about 30 mm.

In an embodiment, the blow hole may be provided in plurality, and each of the blow holes may overlap a corresponding air pocket among the air pockets in a plan view.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

In this specification, it will be understood that when an element (or region, layer, portion, etc.) is referred to as being "on", "connected to" or "coupled to" another element, it can be directly on, connected or coupled to the other element, or intervening elements may be present.

Like reference numerals refer to like elements throughout. In addition, in the drawings, the thicknesses, ratios, and dimensions of elements are exaggerated for effective description of the technical contents. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or" As used herein, the term "and/or" includes any and all combinations that the associated configurations can define.

It will be understood that, although the terms first, second, etc. may be used herein to describe various elements, these elements should not be limited by these terms. These terms are only used to distinguish one element from another element. For example, a first element could be termed a second element without departing from the scope of the present invention. Similarly, the second element may also be referred to as the first element. The terms of a singular form include plural forms unless otherwise specified.

In addition, terms, such as "under", "lower", "above", "upper" and the like, are used herein for ease of description to describe one element's relation to another element(s) as illustrated in the figures. The above terms are relative concepts and are described based on the directions indicated in the drawings.

It will be understood that the terms "include" and/or "have", when used in this specification, specify the presence of stated features, integers, steps, operations, elements, components and/or combinations thereof, but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, embodiments of the invention will be described with reference to the accompanying drawings.

Figure 1:
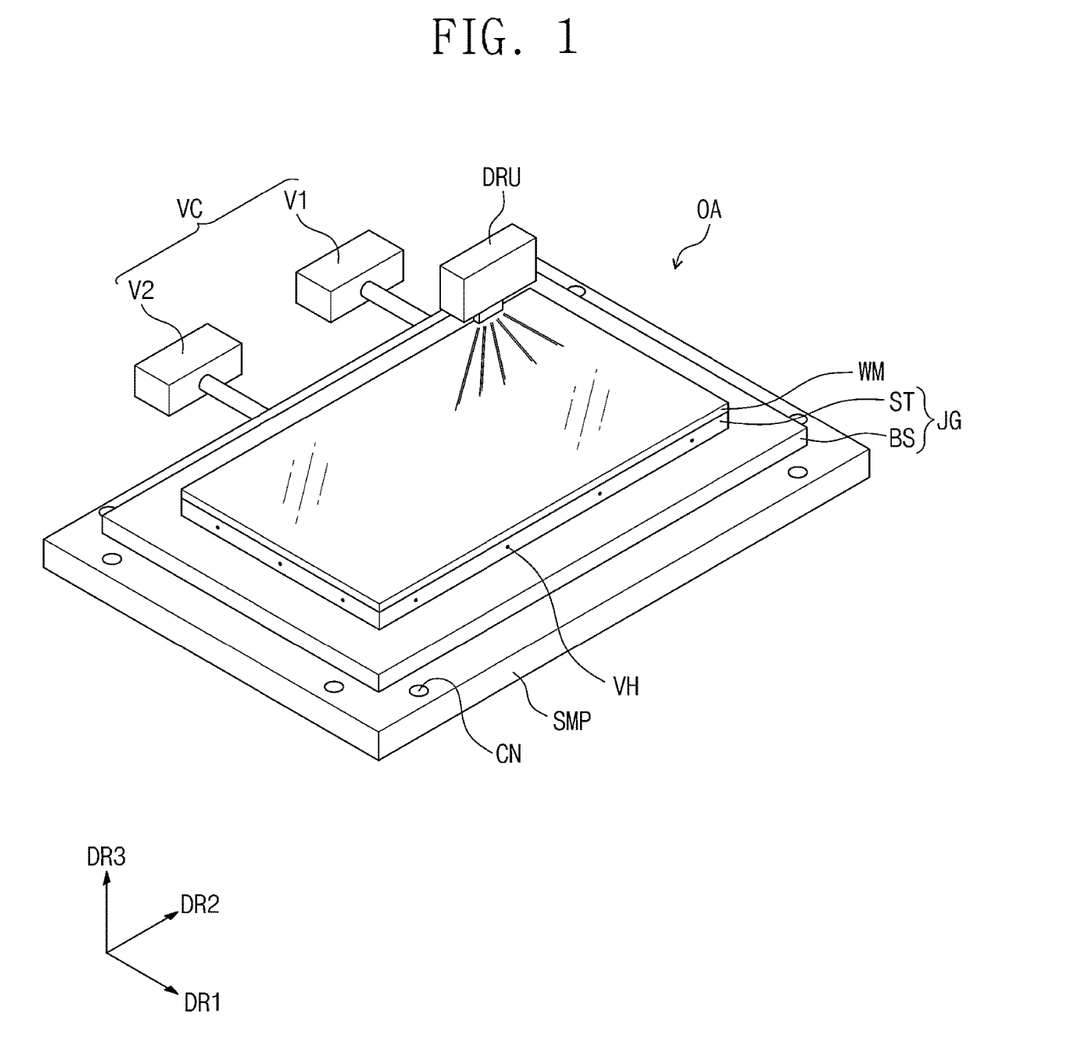
FIG. 1 is a perspective view of a window coating apparatus according to an embodiment of the invention.
Figure 2:
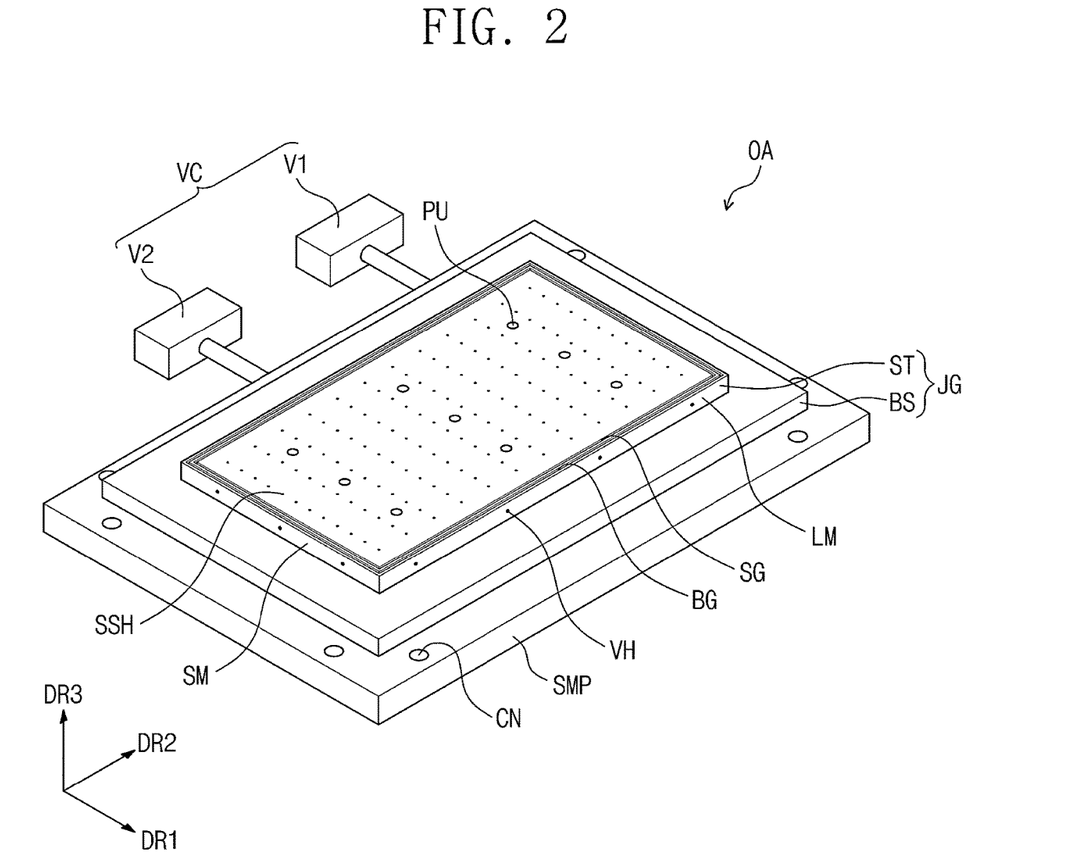
FIG. 2 is a perspective view of the window coating apparatus according to an embodiment of the invention.

FIG. 1 is a perspective view of a window coating apparatus according to an embodiment of the invention. FIG. 2 is a perspective view of the window coating apparatus according to an embodiment of the invention. FIG. 2 illustrates the window coating apparatus OA of FIG. 1, from which a window WM is omitted.

Referring to FIGS. 1 and 2, the window coating apparatus OA according to the present invention may include a support substrate SMP, a window coating jig JG, a window WM, a spray unit DRU, and an air-flow-generating unit VC.

The support substrate SMP may support the window coating jig JG. The window coating jig JG may have an integral shape with the support substrate SMP, or the window coating jig JG may be separated from the support substrate SMP. The support substrate SMP may have a coupling hole CN passing therethrough, where the coupling hole CN is defined therein.

Although not illustrated, the window coating jig JG may be fixed to another equipment by fastening a bolt to the coupling hole CN of the support substrate SMP. The equipment which is coupled to the support substrate SMP is not limited to any one embodiment as long as the equipment is capable of forming an air flow into the support substrate SMP or applying a deposition material on the window WM.

The air-flow-generating unit VC may be coupled to the support substrate SMP. The air-flow-generating unit VC may form an air flow inside the window coating jig JG. The shape of the air-flow-generating unit VC is illustrated as an example, and as long as the equipment is capable of forming an air flow inside the window coating jig JG, the equipment is not limited to any one embodiment.

The air-flow-generating unit VC may include a first unit V1 and a second unit V2. The first unit V1 may be a suction device configured to suck an air flow between the window WM and the window coating jig JG so that the window WM can be easily attached to the window coating jig JG. The second unit V2 may be an exhaust device configured to form an air flow opposite to the air flow which is formed by the first unit V1.

The window coating jig JG may support the window WM. The window coating jig JG may include a base part BS and a stage ST. The base part BS and the stage ST are provided in an integral shape, but for the convenience of explanation, separate reference numerals will be used to describe the base part BS and the stage ST.

The base part BS may be coupled to the support substrate SMP. The base part BS may protrude from the support substrate SMP in a third direction DR3 (i.e., thickness direction of the support substrate SMP). The stage ST may protrude from the base part BS in the third direction DR3 to support the window WM.

As illustrated in FIG. 2, the stage ST has grooves BG and SG formed by removing a portion of the stage ST along the third direction DR3, where the grooves BG and SG are defined therein.

A blow groove BG may be provided along the edge of the stage ST and surround a suction groove SG. The suction groove SG may be provided along the edge of the stage ST and located more inside than the blow groove BG on the stage ST.

The air flow (hereinafter, downward air flow) formed in the first unit V1 may be provided to the suction groove SG, and the air flow (hereinafter, upward air flow) formed in the second unit V2 may be provided to the blow groove BG.

The stage ST according to this embodiment may have additional suction holes SSH passing therethrough, where the additional suction holes is defined therein. The downward air flow formed in the first unit V1 may be provided to the additional suction holes SSH. The additional suction holes SSH may be surrounded by the suction groove SG. The additional suction holes SSH may be provided in plurality and arranged to be spaced apart from each other in the first direction DR1 and the second direction DR2.

According to this embodiment, as the downward air flow is provided to the suction groove SG and the additional suction holes SSH, the window WM may be easily coupled onto the stage ST. In this case, the space between the suction groove SG and the additional suction holes SSH and the window WM may be provided in a vacuum state.

An upward air flow to separate the window WM from the stage ST may be provided to the blow groove BG. Accordingly, when an upward air flow is provided through the blow groove BG in a state in which the window WM is coupled to the stage ST by the suction groove SG and the additional suction holes SSH, a lifting phenomenon may occur at an edge portion of the window WM overlapping the blow groove BG in a plan view.

According to the present invention, the stage ST may have a vent opening VH passing through a sidewall part (e.g., first sidewall part SW1) defining the outer wall of the stage ST, where the vent opening VH is defined therein. The vent opening VH may be defined only on at least one of the short side part SM of the stage ST extending in the first direction DR1 or the long side part LM thereof extending in the second direction DR2. For example, the vent opening VH may be provided in plurality, and in this case, the number of the vent openings VH may be about 4 to about 12.

The vent openings VH are defined on the short side part SM and the long side part LM. More specifically, in an embodiment, the vent openings VH may be spaced apart from each other in the first direction DR1 on the short side part SM, and spaced apart from each other in the second direction DR2 on the long side part LM. According to another embodiment of the invention, the vent openings VH may be arranged to be spaced apart from each other in the second direction DR2 only on the long side part LM.

The upward air flow provided to the blow groove BG may be discharged to the outside through the vent openings VH. Accordingly, although an upward air flow is provided to the blow groove BG, it is possible to prevent the occurrence of a lifting phenomenon at an edge portion of the window WM by the upward air flow. A detailed description of this will be given later.

According to this embodiment, the stage ST may have a pin-up hole PU passing therethrough, where the pin-up hole is defined therein. A pin having an adjustable length may be disposed in the pin-up hole PU in the third direction DR3. By means of the pin, the window coating jig JG may be vertically moved in the third direction DR3 from the equipment (not illustrated) coupled to the support substrate SMP. The pin-up hole PU may be provided in plurality. However, the embodiment of the invention is not limited thereto, and the pin-up hole PU may be omitted in another embodiment.

The window WM may be disposed on the stage ST. As long as the window WM is disposed on a display panel including a pixel that emits light, the window WM is not limited to any one embodiment and may be applied. In another embodiment, for example, the display panel may be any one of a liquid crystal display panel, an electrophoretic display panel, a microelectromechanical system ("MEMS") display panel, an electrowetting display panel, an organic light-emitting display panel, and an inorganic light-emitting display panel, and the embodiment of the invention is not particularly limited.

In addition, the window WM may be disposed on any one of a foldable display panel and a rolling display panel, and is not limited to any one embodiment. In this case, the window WM may be chemically strengthened glass. The window WM may minimize the occurrence of wrinkles although folding and unfolding are repeated.

Although FIG. 1 illustrates that the window WM has a tetragonal shape along the first direction DR1 and the second direction DR2, this is illustrated as an example, and the shape of the window WM is not limited to any one embodiment.

A layer, which is formed on the window WM by using the window coating apparatus OA, is not limited to any one embodiment as long as the layer is a functional layer formed on the upper surface or the lower surface of the window WM which is used as a base. For example, the functional layer may include at least any one of a hard coating layer, an anti-fingerprint layer, an impact absorption layer, or a window protection layer. Accordingly, a coating material, which is sprayed from the spray unit DRU to the window WM, may include any one of an organic material and an inorganic material, and is not limited to any one embodiment.

Figure 3:
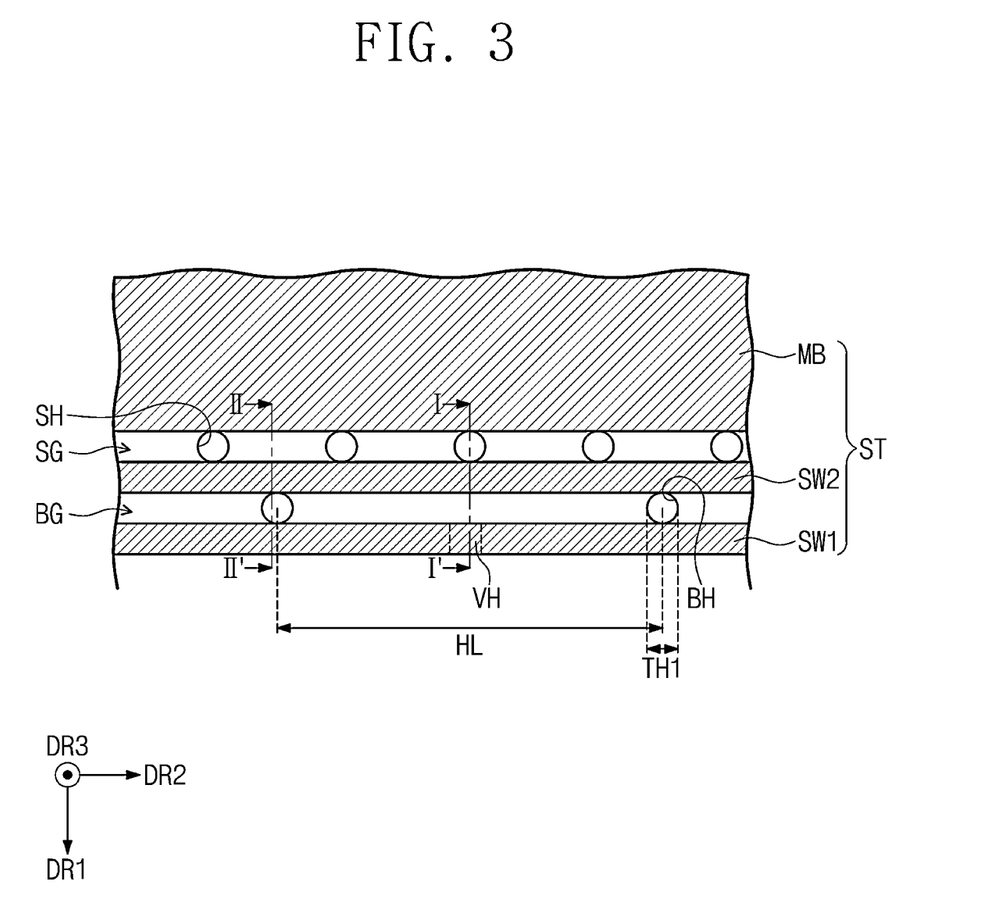
FIG. 3 is a plan view of the window coating apparatus according to an embodiment of the invention.
Figure 4:
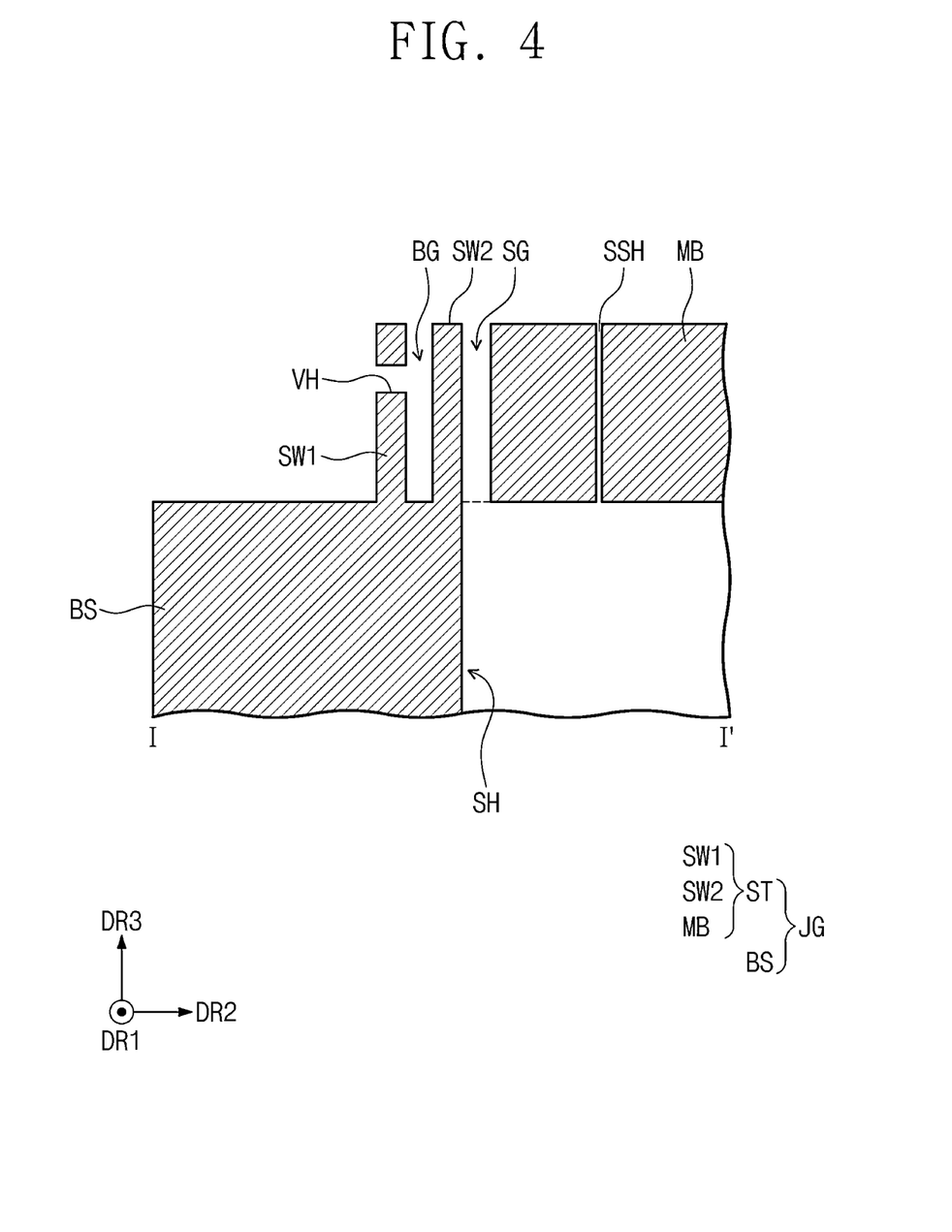
FIG. 4 is a cross-sectional view taken along line I-I' of FIG. 3.
Figure 5:
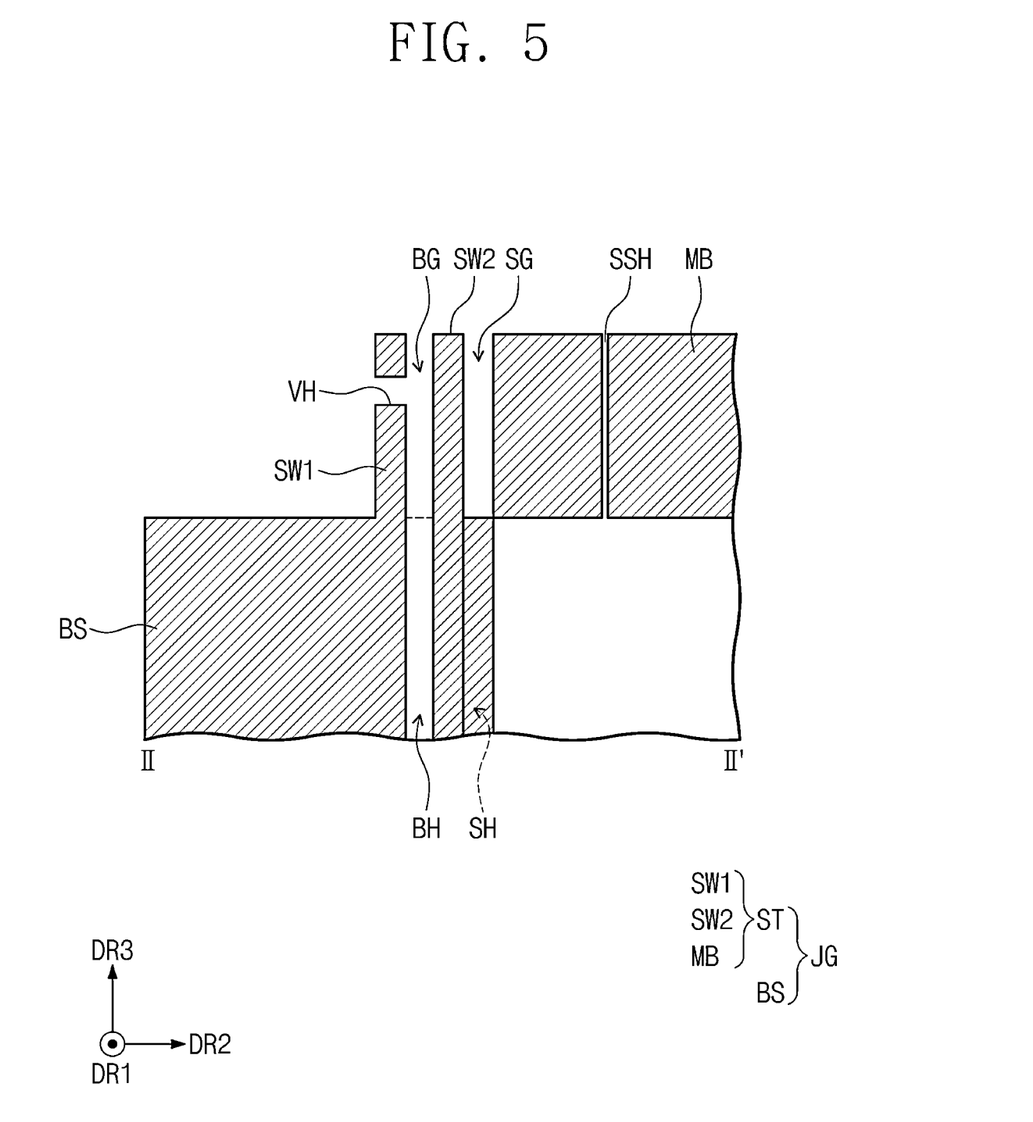
FIG. 5 is a cross-sectional view taken along line II-II' of FIG. 3.
Figure 6A:
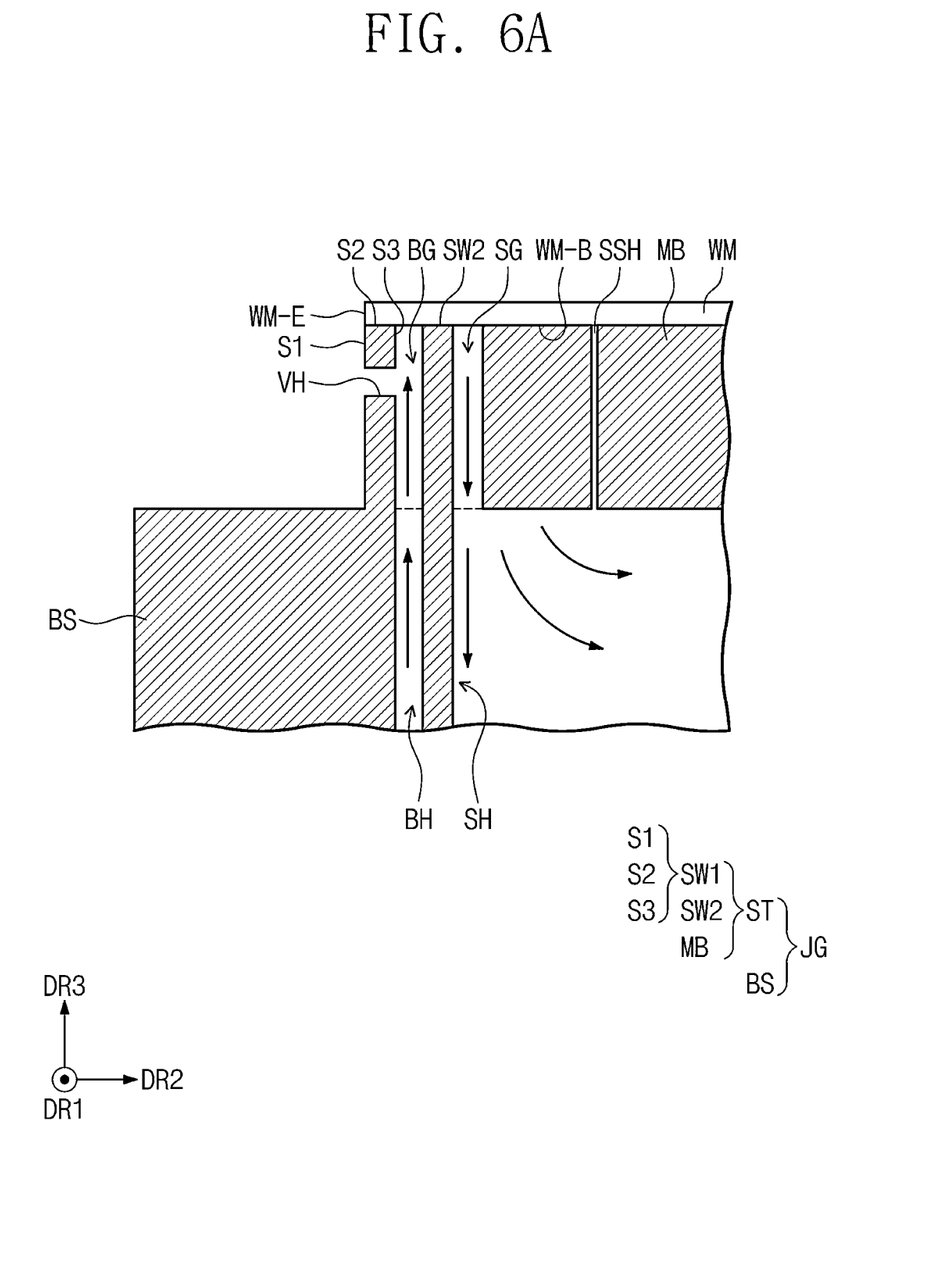
FIG. 6A is a cross-sectional view illustrating a window coating method according to an embodiment of the invention.
Figure 6B:
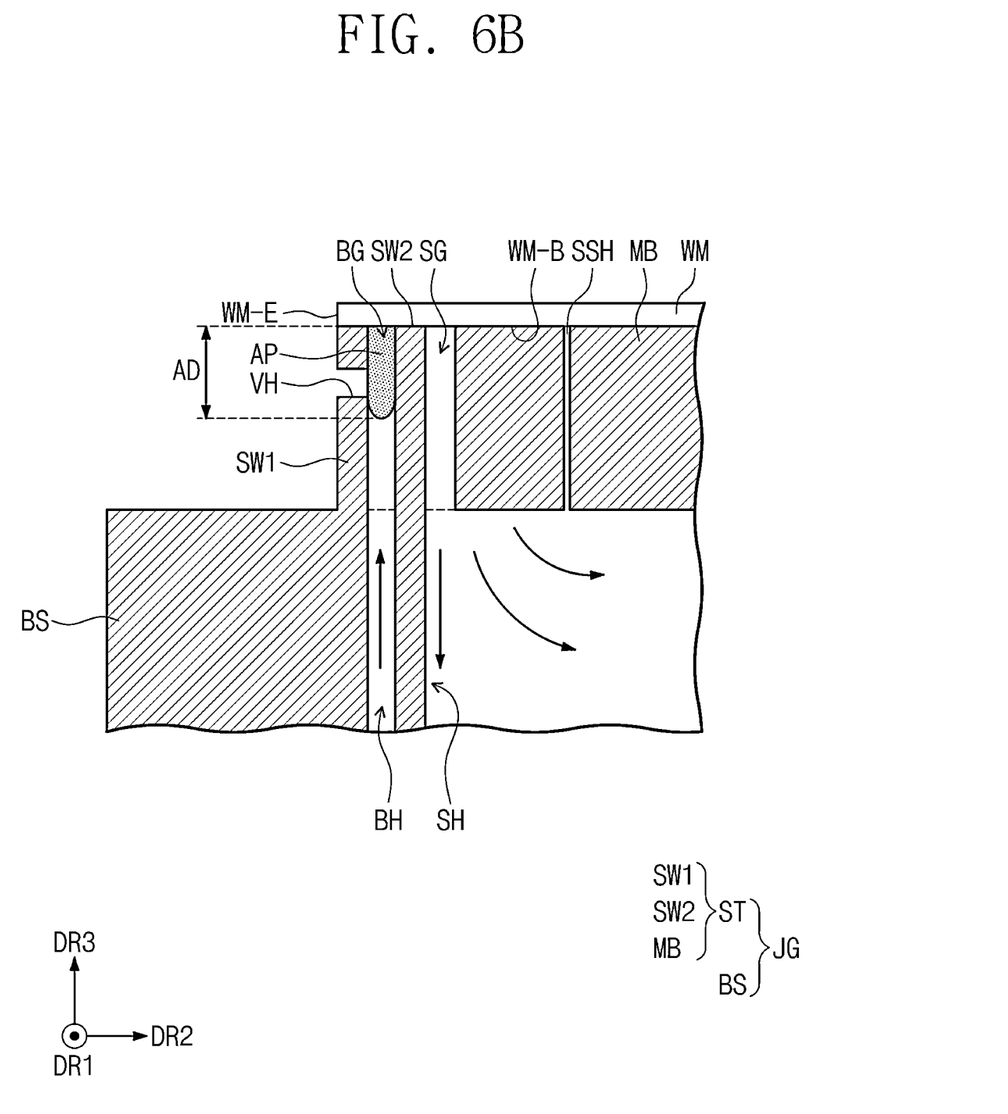
FIG. 6B is a cross-sectional view illustrating the window coating method according to an embodiment of the invention.
Figure 6C:
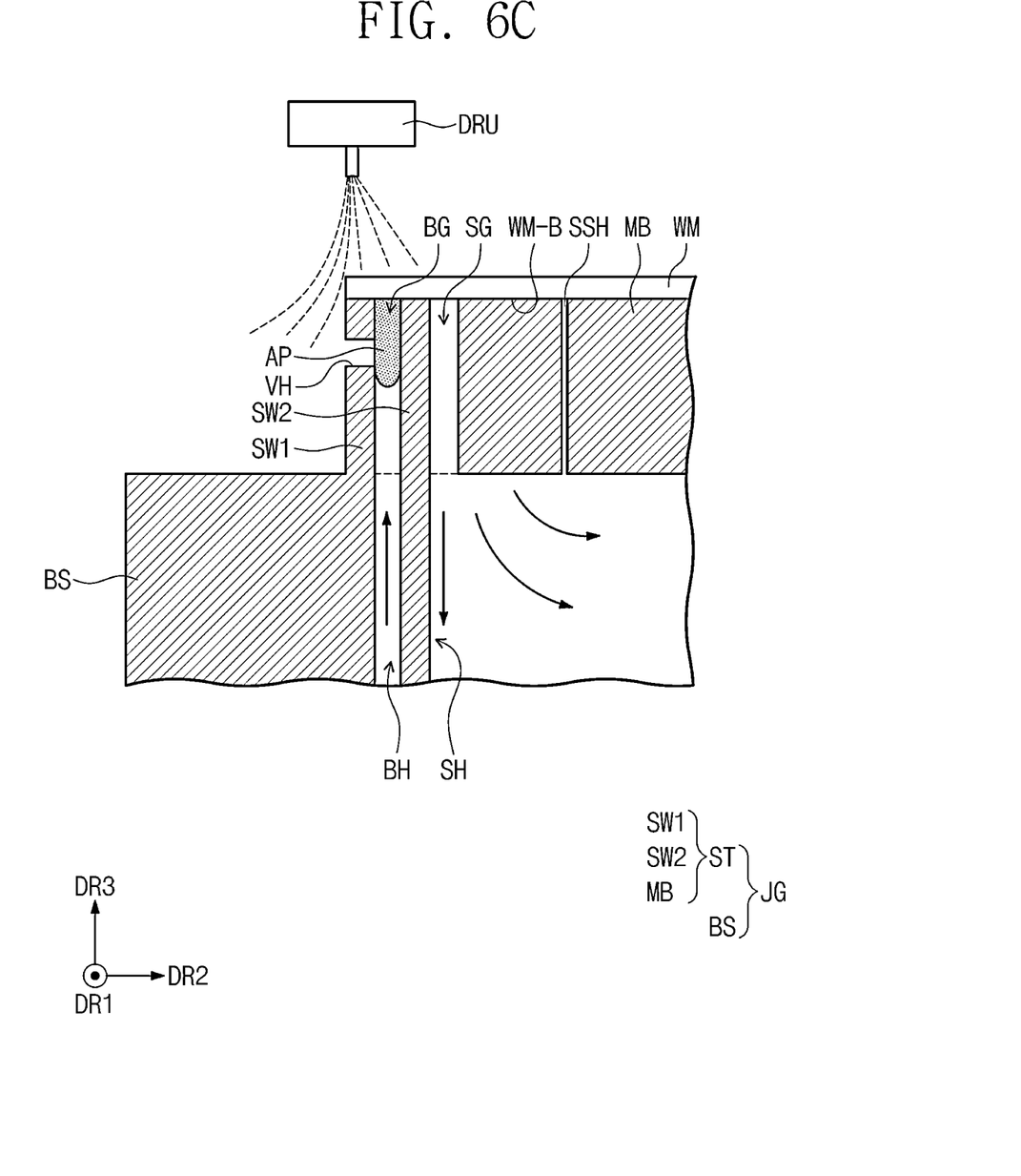
FIG. 6C is a cross-sectional view illustrating the window coating method according to an embodiment of the invention.

FIG. 3 is a plan view of the window coating apparatus according to an embodiment of the invention. FIG. 4 is a cross-sectional view taken along line I-I' of FIG. 3. FIG. 5 is a cross-sectional view taken along line II-II' of FIG. 3. FIG. 6A is a cross-sectional view illustrating a window coating method according to an embodiment of the invention. FIG. 6B is a cross-sectional view illustrating the window coating method according to an embodiment of the invention. FIG. 6C is a cross-sectional view illustrating the window coating method according to an embodiment of the invention. Here, the "plan view" is defined as a view in the third direction DR3.

Referring to FIGS. 3 to 5, the stage ST may include a support part MB, a first sidewall part SW1, and a second sidewall part SW2.

The support part MB may be surrounded by the first sidewall part SW1 and the second sidewall part SW2. The support part MB may have the above-described additional suction holes SSH and pin-up hole PU defined therein.

The first sidewall part SW1 may define the outer wall of the stage ST. The second sidewall part SW2 may be disposed between the first sidewall part SW1 and the support part MB.

In the present invention, the blow groove BG may be defined as a space between the first side wall SW1 and the second side wall SW2, and the suction groove SG may be defined as a space between the second side wall SW2 and the support part MB. The above-described vent opening VH may be defined to pass through in a direction from the outside of the first sidewall part SW1 toward the second sidewall part SW2.

The base part BS may have a suction hole SH and a blow hole BH passing through the base part BS in the third direction DR3, where the suction hole SH and the blow hole BH are defined therein. Each of the suction hole SH and the blow hole BH may be circular on a plane.

The suction hole SH may overlap the suction groove SG and the additional suction hole SSH in a plan view. The suction hole SH may be connected to the first unit V1 (refer to FIG. 1) to serve as a passage through which a downward air flow enters. The blow hole BH may overlap the blow groove BG in a plan view. The blow hole BH may be connected to the second unit V2 (refer to FIG. 1) to serve as a passage through which an upward air flow enters.

As illustrated in FIG. 3, the suction hole SH may be provided in plurality and arranged to be spaced apart from each other in the second direction DR2 in which the suction groove SG extends. The blow hole BH may be provided in plurality and arranged to be spaced apart from each other in the second direction DR2 in which the blow groove BG extends.

The number of the suction holes SM may be greater than the number of the blow holes BH. The separation distance HL between adjacent blow holes BH in the second direction DR2 may be about 10 mm to about 30 mm. A first diameter TH1 of each of the blow holes BH may be about 0.3 mm to about 1.0 mm.

In FIG. 3, the vent opening VH defined to pass through the first sidewall part SW1 is illustrated by a dotted line. According to the present invention, the vent opening VH may be spaced apart from the blow hole BH when viewed from the first direction DR1. The direction (e.g., the third direction DR3) of the upward air flow provided from the blow hole BH is different from the direction (e.g., the second direction DR2 or the first direction DR1) of the air discharged through the vent opening VH. Accordingly, the upward air flow provided from the blow hole BH may not be directly discharged to the vent opening VH, but may build up an air pressure in the blow groove BG.

With reference to FIGS. 6A to 6C, a window coating method will be described through the relationship between the window WM and the upward/downward air flows which are provided to the blow groove BG, the vent opening VH, and the suction groove SG.

Referring to FIGS. 6A to 6C, the window coating method according to the present invention may include providing the window WM on the window coating jig JG. The window coating jig JG may include: a base part BS having a blow hole BH and a suction hole SH defined therein; and a stage ST having a blow groove BG connected to the blow hole BH and a suction groove SG connected to the suction hole SH, where the blow groove BG and the suction groove SG are defined therein.

Hereafter, the window coating method according to the present invention may include providing a downward air flow to the suction hole SH to fix the window WM on the stage ST. The downward air flow may be provided through the first unit V1. In this case, the downward air flow may be provided to the additional suction hole SSH. Accordingly, the window WM may be easily coupled to the stage ST.

Hereafter, the window coating method according to the present invention may include providing an upward air flow to the blow hole BH to form an air pocket AP which is formed due to a difference in air pressure between the window WM and the blow groove BG.

The air pocket AP may be formed due to a difference between the pressure of air which is provided through the blow hole BH and the pressure of air which is discharged to the outside through the vent opening VH. That is, when the upward air flow is provided through the blow hole BH to an inner space defined by the first sidewall part SW1, the base part BS, the second sidewall part SW2, and the rear surface WM-B of the window WM, the air pocket AP may be formed due to a difference between the air pressure of the air flow which is provided to the inner space and the air pressure of the air flow which is discharged to the outside through the vent opening VH defined in the first side wall SW1. In this case, the pressure of air which is provided through the blow hole BH may be greater than the pressure of air which is discharged to the outside through the vent opening VH.

The difference in air pressure, by which the air pocket AP is formed, may be controlled by the diameter, area, and number of each of the vent opening VH and the blow hole BH. According to an embodiment of the invention, the depth AD of the air pocket AP from the rear surface WM-B of the window WM may be about 0.4 mm to about 1.0 mm.

When the depth AD of the air pocket AP is less than about 0.4 mm, that is, when the pressure of air which is provided through the blow hole BH is smaller than the pressure of air which is discharged to the outside through the vent opening VH, the air pocket AP may be formed at the boundary of the vent opening VH, thus making it difficult to form the air pocket AP.

When the depth AD of the air pocket AP exceeds about 1.0 mm, that is, when the pressure of air which is provided through the blow hole BH is greater than the pressure of air which is discharged to the outside through the vent opening VH, a problem may occur in which the rear surface WM-B adjacent to an edge WM-E of the window WM is lifted.

The air pocket AP may be provided in plurality inside the blow groove BG. The separation distance between adjacent air pockets AP may be the same as the separation distance of the blow holes BH. Accordingly, each of the blow holes BH may overlap a corresponding air pocket AP among the air pockets AP, and the separation distance between adjacent air pockets AP may be about 10 mm to about 30 mm.

Hereafter, the window coating method according to the present invention may include applying a coating solution on the window WM. The coating solution may be provided on the window WM by using the above-described spray unit DRU.

In the step of applying the coating solution to the window WM, the air pocket AP may prevent a defect in which the coating solution is coated on the rear surface WM-B adjacent to the edge WM-E of the window WM. For example, when a downward air flow occurs in the suction groove SG and the additional suction hole SSH in the step of fixing the window WM on the stage ST, a phenomenon may occur in which the rear surface WM-B adjacent to the edge WM-E of the window WM is lifted from the first sidewall part SW1. In this case, as the air pocket AP is formed under the rear surface WM-B adjacent to the edge WM-E of the window WM, it is possible to effectively prevent the coating solution from penetrating into the rear surface WM-B.

In the case of the window coating method using the window coating jig JG according to the present invention, as the coating solution which is applied to the rear surface WM-B of the window WM is minimized, the window WM having improved quality may be manufactured and the window coating method having improved process efficiency may be provided.

Referring again to FIG. 6A, the first sidewall part SW1 may include a first side surface S1 protruding from the base part BS in the third direction DR3 and defining the outer wall of the stage ST, a second side surface S3 opposite to the first side surface S1 and facing the second side wall SW2, and an upper surface S2 connecting the first side surface S1 and the second side surface S3 to each other and coming in contact with the rear surface WM-B of the window WM. The edge WM-E of the window WM according to an embodiment of the invention may be aligned with the first side surface S1 in the third direction DR3.

Figure 7:
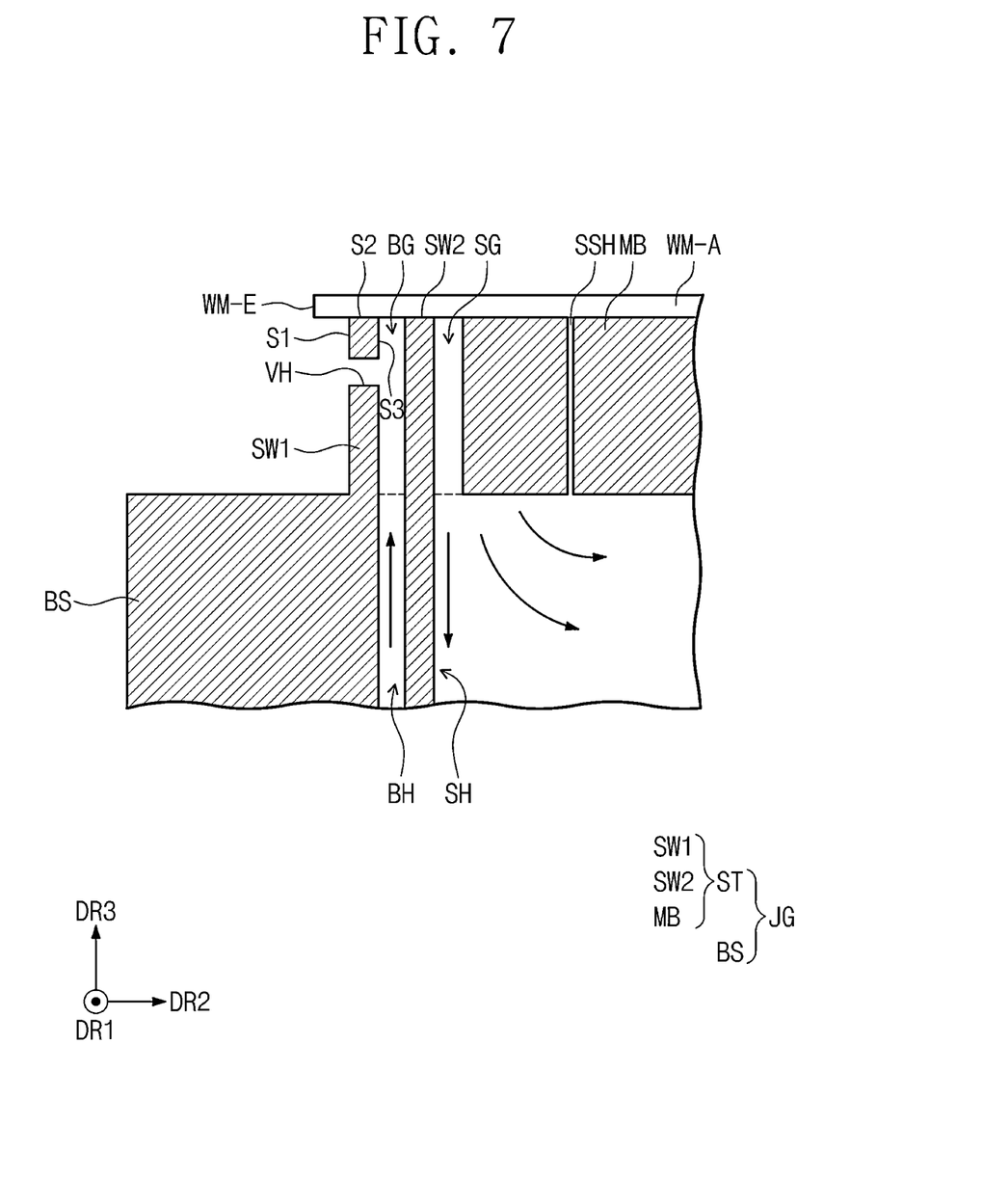
FIG. 7 is a cross-sectional view of the window coating apparatus according to an embodiment of the invention.

FIG. 7 is a cross-sectional view of the window coating apparatus according to an embodiment of the invention. Same/similar reference numerals will be used for the same/similar components as those described with reference to FIGS. 6A to 6C, and duplicate descriptions will be omitted.

Referring to FIG. 7, the first sidewall part SW1 may include a first side surface S1 protruding from the base part BS in the third direction DR3 and defining the outer wall of the stage ST, a second side surface S3 opposite to the first side surface S1 and facing the second side wall SW2, and an upper surface S2 connecting the first side surface S1 and the second side surface S3 to each other and coming in contact with the rear surface WM-B of the window WM. The edge WM-E of the window WM according to an embodiment of the invention may protrude from the first side surface S1 toward the base part BS. In this case, the length thereof protruding from the first side surface S1 may be about 1 micrometers (μm) to about 500 μm.

Figure 8:
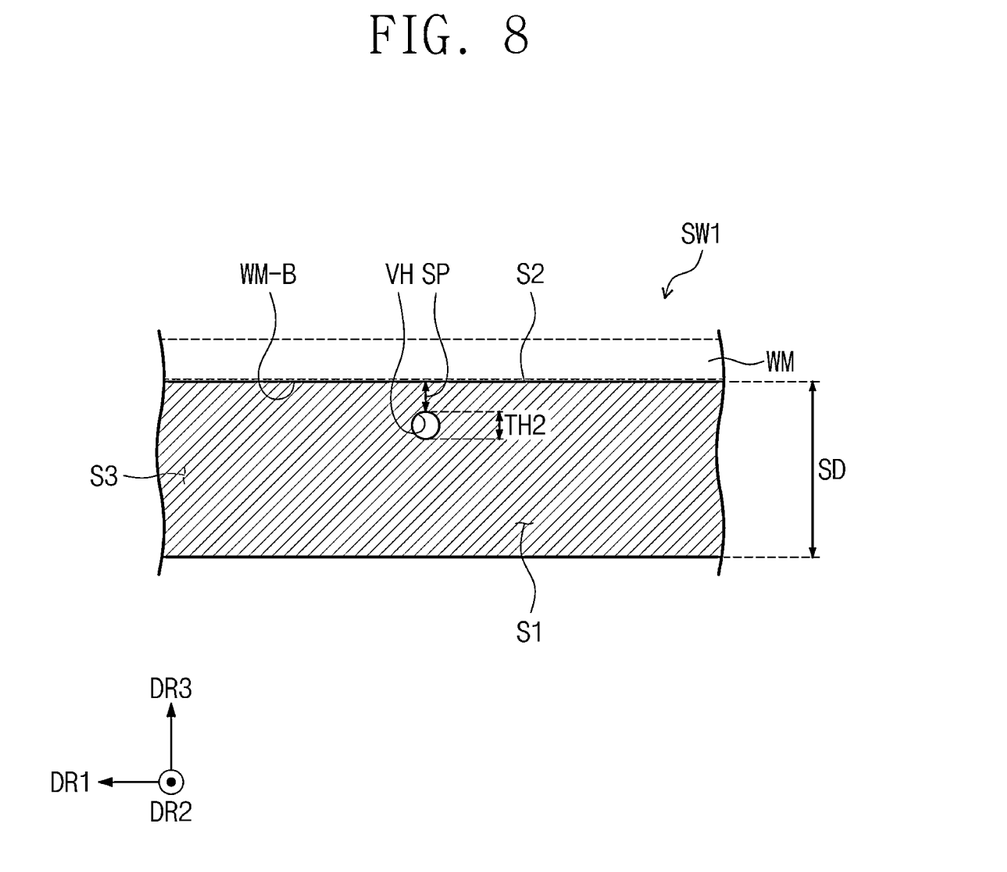
FIG. 8 is a side view of the window coating apparatus according to an embodiment of the invention.
Figure 9:
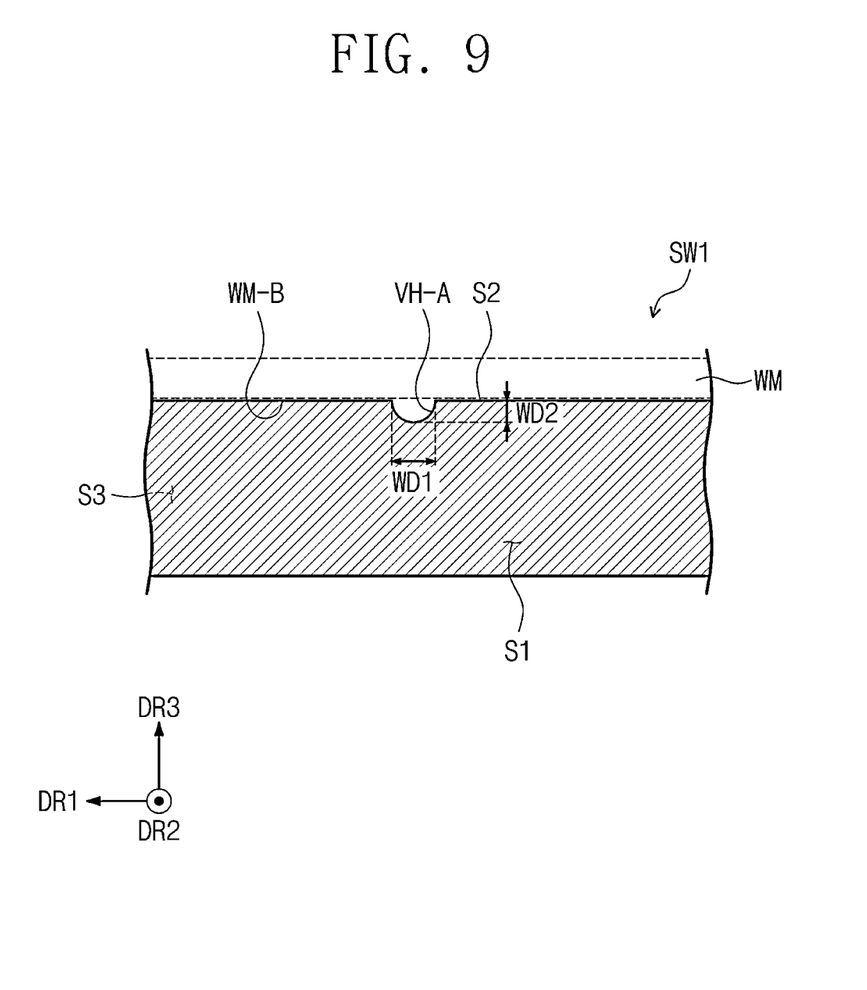
FIG. 9 is a side view of the window coating apparatus according to another embodiment of the invention.

FIG. 8 is a side view of the window coating apparatus according to an embodiment of the invention. FIG. 9 is a side view of the window coating apparatus according to another embodiment of the invention. Same/similar reference numerals will be used for the same/similar components as those described with reference to FIGS. 1 to 6C, and duplicate descriptions will be omitted.

FIG. 8 illustrates a first sidewall part SW1 having a vent opening VH defined therein. The first sidewall part SW1 may correspond to the first sidewall part SW1 described with reference to FIG. 4.

The first sidewall part SW1 may include a first side surface S1 protruding from the base part BS in the third direction DR3 and defining the outer wall of the stage ST, a second side surface S3 opposite to the first side surface S1, and an upper surface S2 connecting the first side surface S1 and the second side surface S3 to each other and coming in contact with the rear surface WM-B of the window WM (indicated by a dotted line).

The vent opening VH according to an embodiment of the invention may be formed at a position spaced apart from the upper surface S2 in the third direction DR3. The vent opening VH may be formed to pass through the second side surface S3 from the first side surface S1. The separation distance SP from the upper surface S2 to the vent opening VH may be about 0.6 mm to about 1.0 mm.

The vent opening VH may be spaced apart from the blow holes BH (refer to FIG. 4) when viewed in the second direction DR2. Accordingly, although the vent opening VH is formed in the first sidewall part SW1, an upward air flow is provided to the blow holes BH and, therefore, no influence may be exerted on the formation of the air pocket AP (refer to FIG. 6B) overlapping the blow holes BH in a plan view. The diameter TH2 of the vent opening VH according to an embodiment of the invention may be about 0.3 mm to about 1.0 mm.

The height SD of the first sidewall part SW1 protruding from the base part BS (refer to FIG. 4) in the third direction DR3 may be about 1 mm to about 5 mm. The protruding height of the first sidewall part SW1 may be the same as the protruding height of the stage ST (refer to FIG. 4) from the base part BS.

FIG. 9 illustrates a first sidewall part SW1 having a vent opening VH-A defined therein. The first sidewall part SW1 may correspond to the first sidewall part SW1 described with reference to FIG. 4.

The first sidewall part SW1 may include a first side surface S1 protruding from the base part BS in the third direction DR3 and defining the outer wall of the stage ST, a second side surface S3 opposite to the first side surface S1, and an upper surface S2 connecting the first side surface S1 and the second side surface S3 to each other and coming in contact with the rear surface WM-B of the window WM (indicated by a dotted line).

The vent opening VH-A according to an embodiment of the invention may be formed by being recessed in the third direction DR3 from the upper surface S2. The vent opening VH-A may have a predetermined curvature. For example, the vent opening VH-A may have a semicircular shape when viewed in the second direction DR2. In this case, a first distance WD1 between the two points in the removed portion on the upper surface S2 may be greater than a second distance WD2 between the upper surface S2 and the deepest recessed point. For example, the first distance WD1 may be about 0.3 mm, and the second distance WD2 may be about 0.1 mm.

Figure 10A:
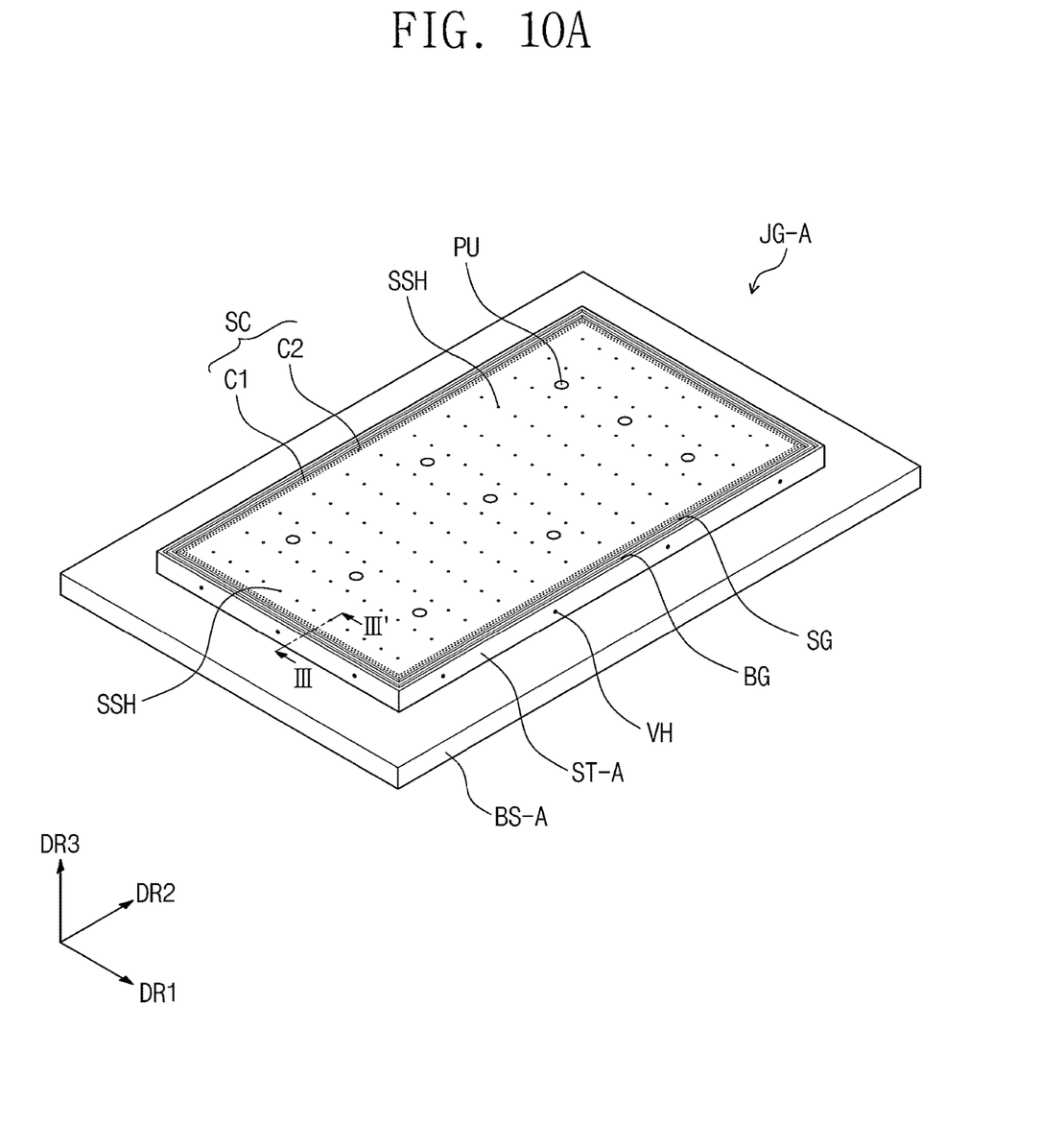
FIG. 10A is a perspective view of a window coating jig according to an embodiment of the invention.
Figure 10B:
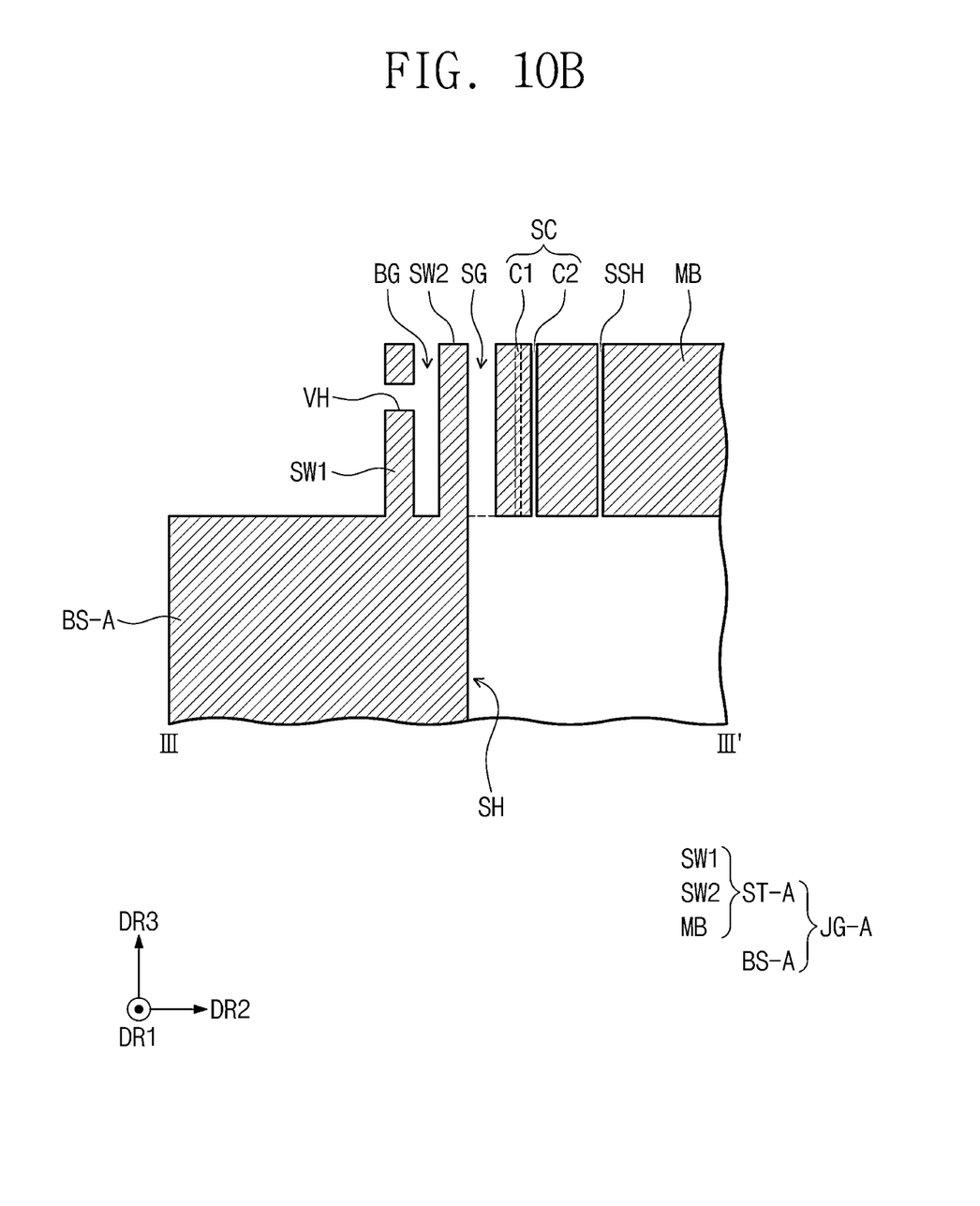
FIG. 10B is a cross-sectional view taken along line II-II' of FIG. 10A.

FIG. 10A is a perspective view of a window coating jig according to an embodiment of the invention. FIG. 10B is a cross-sectional view taken along line II-II' of FIG. 10A.

Referring to FIGS. 10A and 10B, the window coating jig JG-A may include a base part BS-A and a stage ST-A.

The base part BS-A may be coupled to the support substrate SMP (refer to FIG. 2). The base part BS-A may protrude from the support substrate SMP in the third direction DR3. The stage ST-A may protrude from the base part BS-A in the third direction DR3 to support the window WM.

The stage ST-A may have grooves BG and SG formed by removing a portion of the stage ST-A along the third direction DR3, additional suction holes SSH, and a pin-up hole PU, where the grooves BG and SG, the additional suction holes SSH, and the pin-up hole PU are defined therein. The descriptions of the arrangements and functions of the grooves BG and SG, the additional suction holes SSH, and the pin-up hole PU may correspond to those of the grooves BG and SG, the additional suction holes SSH, and the pin-up hole PU which have been described with reference to FIGS. 2 to 5.

The stage ST-A according to this embodiment may have a side hole SC defined therein along the edge of the stage ST-A. The side hole SC may be disposed at an inner side closer to the center of the stage ST-A than the suction groove SG at the edge of the stage ST-A. The side hole SC may be defined to pass through a portion of the support part MB, which is adjacent to the second sidewall part SW2.

The side hole SC may be connected to the first unit V1 (refer to FIG. 1) to receive the downward air flow generated from the first unit V1.

The side hole SC may include first row holes C1 and second row holes C2. The first row holes C1 may be arranged to surround the edge of the stage ST-A, which is adjacent to the suction groove SG. The second row holes C2 may be disposed more inward the stage ST-A than the first row holes C1. The second row holes C2 may be arranged in a zigzag manner with the first row holes C1 in a plan view. In FIG. 10B, the first row hole C1 spaced apart from the second row hole C2 is indicated by a dotted line.

In this embodiment, two groups of the first and second row holes C1 and C2 are illustrated, but the embodiment of the invention is not limited thereto, and additional holes defined more inward the stage ST-A than the second row holes C2 may be further included, or any one group of the first and second row holes C1 and C2 may be omitted in another embodiment, and the present invention is not limited to any one embodiment.

According to this embodiment, as the stage ST-A further includes the side hole SC through which a downward air flow is introduced, the window WM (refer to FIG. 6A) may be easily coupled onto the stage ST by the downward air flow which is provided through the additional suction holes SSH, the side hole SC, and the suction groove SG.

In the case of the window coating method using the window coating jig according to the present invention, as the coating solution which is applied to the rear surface of the window is minimized, the window having improved quality may be manufactured and the window coating method having improved process efficiency may be provided.

Although the above has been described with reference to embodiments of the present invention, those skilled in the art or those of ordinary skill in the art will understand that the present invention may be variously modified and changed within the scope not departing from the spirit and technical scope of the present invention described in the claims to be described later.

Therefore, the technical scope of the present invention should not be limited to the contents described in the detailed description of the specification, but should be determined by the claims below.

What is claimed is:

1. A window coating method comprising:
providing a window on a window coating jig comprising a base part and a stage, wherein the base part has a blow hole and a suction hole defined therein, the stage has a blow groove connected to the blow hole, a suction groove connected to the suction hole, and a vent opening formed in an outer wall, and the blow groove, the suction groove, and the vent opening are defined in the stage;
providing a downward air flow to the suction hole by an air-flow-generating unit to fix the window on the stage;
providing an upward air flow to the blow hole by the air-flow-generating unit to form an air pocket which is formed due to a difference in air pressure between the vent opening and the blow groove; and
applying a coating solution on the window,
wherein a pressure of air which is provided from the blow hole is greater than a pressure of air which is discharged from the vent opening to an outside.

2. The window coating method of claim 1, wherein a depth of the air pocket from a rear surface of the window is about 0.4 mm to about 1.0 mm.

3. The window coating method of claim 2, wherein:
the air pocket is provided in plurality in the blow groove, and
a separation distance between adjacent air pockets in the blow grooves is about 10 mm to about 30 mm.

4. The window coating method of claim 3, wherein:
the blow hole is provided in plurality; and
each of the blow holes overlaps a corresponding air pocket among the air pockets in a plan view.

* * * * *